United States Patent [19]

Stumm

[11] Patent Number: 5,768,528
[45] Date of Patent: Jun. 16, 1998

[54] CLIENT-SERVER SYSTEM FOR DELIVERY OF ONLINE INFORMATION

[75] Inventor: Christian Stumm, New York, N.Y.

[73] Assignee: V-Cast, Inc., New York, N.Y.

[21] Appl. No.: 653,611

[22] Filed: May 24, 1996

[51] Int. Cl.$^6$ .............. H04J 3/14; G06F 13/14; G06F 15/16
[52] U.S. Cl. .............. 395/200.61; 395/200.47; 395/182.16; 379/93.25
[58] Field of Search .............. 395/183.03, 331, 395/680, 610, 250, 200.15, 200.16, 200.09, 200.01, 200.61, 200.47, 102.16, 182.16; 358/402; 380/4, 23, 25; 364/514 A, DIG. 1, DIG. 2; 455/435; 379/93.24, 29, 93.25; 340/825.79

[56] References Cited

U.S. PATENT DOCUMENTS

| | | | |
|---|---|---|---|
| 4,740,912 | 4/1988 | Whitaker | 364/900 |
| 4,815,030 | 3/1989 | Cross et al. | 364/900 |
| 4,872,197 | 10/1989 | Pemmaraju | 379/93 |
| 5,187,787 | 2/1993 | Skeen et al. | 395/680 |
| 5,235,680 | 8/1993 | Bijnagte | 395/610 |
| 5,315,708 | 5/1994 | Eidler et al. | 395/250 |
| 5,339,156 | 8/1994 | Ishii | 358/452 |
| 5,343,527 | 8/1994 | Moore | 380/4 |
| 5,404,505 | 4/1995 | Levinson | 395/600 |
| 5,457,746 | 10/1995 | Dolphin | 380/4 |
| 5,491,820 | 2/1996 | Belove et al. | 395/600 |
| 5,497,479 | 3/1996 | Hornbuckle | 395/491 |
| 5,559,958 | 9/1996 | Farrand et al. | 395/183.03 |
| 5,583,864 | 12/1996 | Lightfoot et al. | 370/396 |

*Primary Examiner*—Daniel H. Pan
*Attorney, Agent, or Firm*—Sofer & Haroun, LLP.

[57] ABSTRACT

A method for operating a server system adapted to provide information files to a plurality of subscribers over communications network, such as Internet. A plurality of publishers store their publishing material such as newspapers, magazines or software files in a database server. The database server maintains a schedule of events file adapted to contain information relating to predetermined downloading schedules to the subscribers of the database server. The schedule of events file or the relevant portions of it are then transmitted to individual subscribers so that requests for information can be launched from the subscribers terminals at a predetermined time in accordance with the schedule of event file. The server then transmits to each requesting subscriber a set of predetermined data files as authorized by a corresponding one of the publishers, including each file's name, size and identification code in response to said information request from each one of the subscribers. In accordance with another aspect of the invention, the database server keeps a track of information file transmittals and makes sure that a file has been successfully downloaded. If not, the database server keeps a track of the portion of the files that have been successfully transmitted and attempts to retransmit the portion that has not been received successfully, several times until the entire file is successfully received.

40 Claims, 7 Drawing Sheets

CLIENT-SERVER SYSTEM FOR DELIVERY OF ONLINE INFORMATION

FIELD OF THE INVENTION

This invention relates to a client-server system for delivering online information, and more specifically to a news delivery system configured to send updated information at scheduled intervals.

BACKGROUND OF THE INVENTION

Within the past few years, the number of individuals who access the Internet has grown rapidly. Many individuals utilize the Internet to access news or to purchase software. In response, many news publishers desire to provide the electronic version of their publications to such Internet customers. A drawback encountered by the publishers and providers of other on-line services is the slow data speed over telephone lines. Downloading a news publication with many photographs and advertising images might take few minutes with currently available technology. Many individuals find such a delay to receive a news publication unacceptable. Likewise, many individuals who desire to download software through Internet, have found the delay associated with such downloading unacceptable.

Furthermore, the currently available online systems do not provide means to guarantee the complete transmission and reception of data files. For example, in the event of any interruptions or communication errors, the entire downloading process needs to be repeated at the direction of the user. Such delays have discouraged many users as well as many service providers from utilizing Internet as a means for delivering and receiving electronic publications and/or software.

Another drawback of the currently available online systems is lack of reliability. For example, a publisher may set up an electronic publication, but there can be no assurance that the targeted subscribers will receive the intended information at the right time. The same drawback is applicable to software providers who desire to transmit an application file to their targeted customers.

Thus, there is a need for a reliable online system, wherein information providers transmit desired data to their targeted customers at predetermined interval.

SUMMARY OF THE INVENTION

Briefly in accordance with one aspect of the invention, a method for operating a server system adapted to provide on-line publications to a plurality of subscribers, comprises the steps of: storing in a database server publication data files received from a plurality of publishers; maintaining a schedule of events file adapted to contain information relating to predetermined downloading schedules to the subscribers desiring a corresponding publication; receiving from each subscriber an information request in accordance with the schedule of events file and a list of existing files in the subscriber's database including the file names, file sizes and corresponding file identification code; transmitting to the subscriber a set of predetermined data files as authorized by a corresponding one of the publishers, including each file's name, size and identification code in response to the information request from each one of the subscribers.

Briefly in accordance with another aspect of the invention, the method for operating the server system further comprises the step of receiving from each subscriber the name of files that were not properly received by the subscriber along with the size of the portion of the file received by the subscriber and the CRC code of the portion received by the subscriber; calculating the CRC code of the portion of the file received from said subscriber, comparing the CRC code of the portion of the file received by the subscriber with the calculated CRC code of the portion of the file received from the subscriber; and transmitting the remaining portion of the file to the subscriber when the CRC codes are equal.

Briefly in accordance with another aspect of the invention, the method for operating the server system further comprises the steps of receiving from the subscribers their corresponding local time zones and responsive thereto, transmitting a corresponding offset time necessary to synchronize the subscriber's local time with a publisher's reference time, such that all scheduled events take place at the corresponding publisher's reference time.

In accordance with another aspect of the invention, a method for downloading data files from a server system to a subscriber's computer system, wherein the data files originated by a plurality of publishers, the method comprises the steps of: maintaining a schedule of events file containing a time schedule for downloading the data files; maintaining a log file for tracking the success and failure of the events; transmitting an information request to the server system when the event is launched at a scheduled time; receiving a group of files corresponding to a publisher from the server system, and their corresponding filesizes and CRC codes in response to the information request; and tracking the log file to determine whether the last event scheduled was completed successfully.

In accordance with yet another aspect of the invention, a method for receiving by a subscriber, data files from a server system, said data files generated by a plurality of publishers, said method comprising the steps of: the subscriber communicating with the server system via a computer so as to request datafiles corresponding to each publisher; receiving the datafiles from the server system in response to the request; displaying a channel selection menu on the subscriber's monitor, each channel corresponding to a publisher to which the subscriber is subscribed; displaying a scrolling ticker display configured to display the contents of a ticker file corresponding to a selected channel on the monitor; and displaying a channel identification symbol corresponding to the selected channel.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 1:
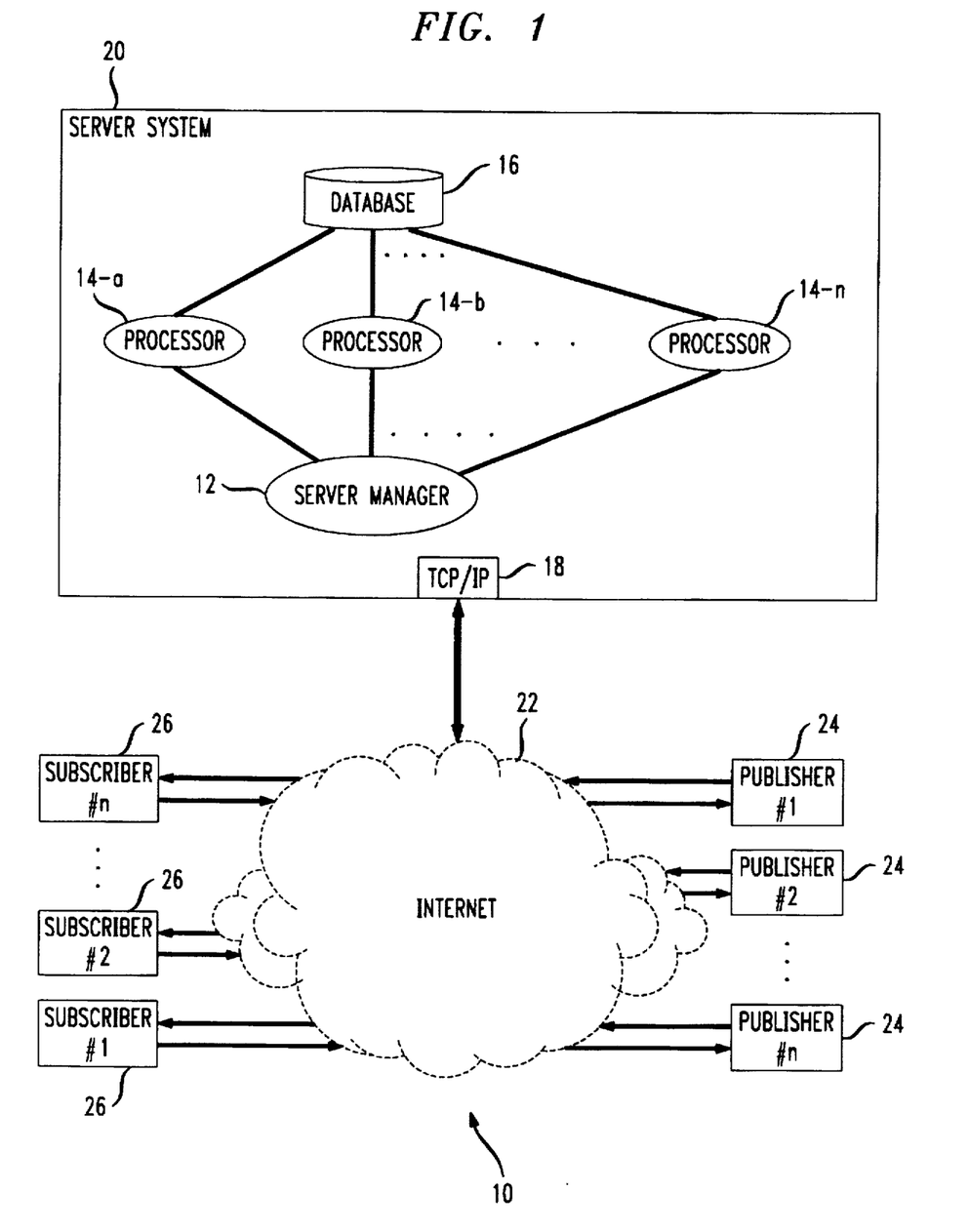
FIG. 1 illustrates a communications network employing an embodiment of the present invention.

FIG. 1 illustrates a communications environment employing an on-line delivery system 10 used to transmit on-line data in accordance with an embodiment of the present invention, although the invention is not limited in scope in that respect. A server system 20 is configured to send and receive information via a computer network, such as Internet 22. Server system 20 includes a server manager 12, which is adapted to control the operations of server system 20.

Server manager 12 has multiple output terminals each coupled to a processor such as 14-a through 14-n, for processing the flow of information received and transmitted by server system 20. Processors 14, in accordance with one embodiment of the invention are advantageously operated by a UNIX operating system, although the invention is not limited in scope in that respect. Processors 14 are coupled to a database 16, which is employed to store various data intended for use by subscribers of on-line delivery system 10. Server system 20 is configured to operate as a database server such as those commercially available in the market, including SYBASE database server. Other functions of server system 20 will be explained in more detail below.

A plurality of publishers 24 communicate with server system 20 via Internet 22. Each publisher 24 transmits a plurality of data files to server system 20 for use by subscribers of on-line delivery system 10 as will be explained in more detail hereinafter. These data files may include any sort of information that each publisher desires to disseminate electronically in addition to its hardcopy versions. Each publisher also sends additional information to server system 20 relating to the flow of the information to the subscribers, such as types of information that need be sent, schedules for such transmittals, the number of updates per date and so forth.

Finally, a plurality of subscribers employ personal computers 26 to communicate with server system 20 via Internet 22. Each computer 26 includes a subscriber software system 40 (FIG. 2), also known as agent, that is configured to communicate with server system 20 at a predetermined schedule, and is further configured to download appropriate information from server system 20 in accordance with one embodiment of the invention, although the invention is not limited in scope in that respect. Subscriber software system 40 preferably functions in the background, so that the user of computer 26 is allowed to use the computer for other purposes, while the software system is completing its job.

In accordance with one embodiment of the invention, publishers 24 may be news publishers who publish various news publications. Each publisher 24 who desires to make available its publications for on-line transmission, generates all corresponding data files that contain information corresponding to such publications. These data files may include files containing information representing clip audio/video images and photographs relating to news articles and other files corresponding to the text of such articles. Some publishers may also desire to make available other updated information throughout the day. For example, financial newspapers may prepare few editions of their electronic paper as certain information is updated throughout the day.

In accordance with a preferred embodiment of the invention, each subscriber installs a plurality of subscriber software systems each configured to operate with a specific publisher. Thus, each subscriber acquires and installs a new software system to receive data information provided by a corresponding publisher. However, the invention is not limited in scope in that respect. For example, in accordance to the principles of the present invention, a software system may be configured such that it can operate with a plurality of publisher systems at the same time.

As mentioned before, each publisher provides its electronic publications to server system 20 in the form of data files. To this end, publisher 24 transmits the data files that it intends to target to the subscribers to server system 20 for storage in database 16. At predetermined intervals, each subscriber software system operates to connect a corresponding computer 26 to server system 20 to download the intended information into its system. Once the information has been successfully downloaded, the subscriber software system informs the subscriber that the information is available for viewing. As mentioned, the operation of the subscriber software system including the connection to server system 20 and downloading the appropriate data files from server system 20 is typically handled by computer 26 in the background. Thus a subscriber can use computer 26 for other purposes, while the information is being acquired and downloaded from server system 20. Because the system acquires and downloads the information at a predetermined schedule, and notifies the subscriber after the information is available, the subscriber does not experience the waiting time associated with downloading information via an Internet communication session. Thus, the downloading process becomes transparent to the subscriber, leading to increasing demand for subscription.

Computers 26 may communicate with server system 20 via a variety of available communications schemes. For example, computers 26 advantageously establish communications by employing direct modem connections to server system 20. In the alternative they communicate via a modem and an X.25 network system. The communications process in accordance with X.25 protocol is well-known in the art. Furthermore, computers 26 may communicate with server system 20 via TCP/IP sockets.

Figure 2:
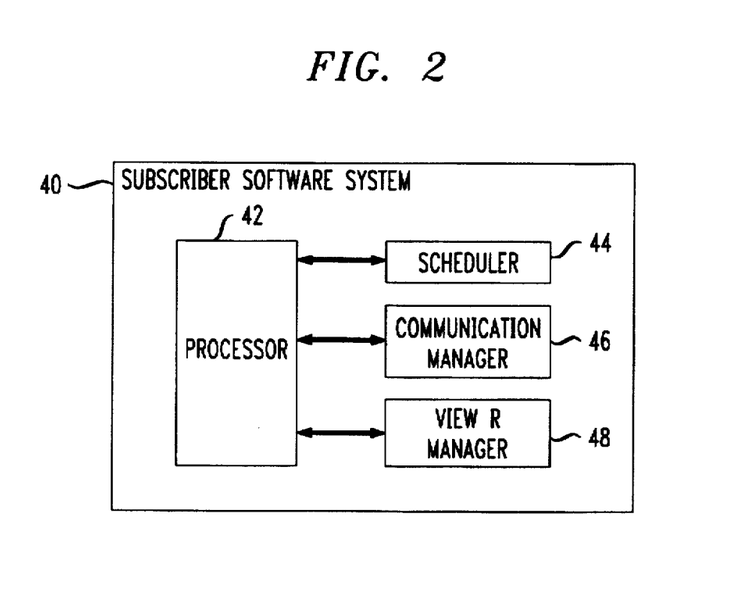
FIG. 2 illustrates a block diagram of a subscriber system communicating in a communications network in accordance with the present invention.

FIG. 2 is a block diagram illustrating some of the components of a subscriber software system 40 in accordance with one embodiment of the invention, although the invention is not limited in scope in that respect. Subscriber software system 40 is controlled by a microprocessor 42. The software system comprises a scheduler 44, a communications manager 46, and a viewer manager 48. In one embodiment of the invention, a data storage manager (not shown) performs the operation of organizing and storing data files relating to the operation of the system, although the invention is not limited in scope in that respect.

Typically, subscriber software system 40 is installed on a computer 26 by employing few installation steps. During the first step, the subscriber assigns a subdirectory to store therein the subscriber software system and all data files to be received from server system 20. During the following step, the subscriber determines how to connect computer 26 to server system 20. For example, subscriber software system 40 queries the subscriber whether to configure the system to communicate with server system 20 via a TCP/IP communications protocol, or via a X.25 protocol. Subscriber software system 40 also queries the subscriber whether a fire-wall system is employed to connect computer 26 to Internet 22. If so, the software system requests information about the fire-wall system. The operation of fire-wall systems is well-known and for purpose of brevity is not described here in detail. Briefly, a fire wall system limits the access of a plurality of computers within an internal computer network in an organization to outside world.

During the next step, subscriber software system 40 queries the subscriber for personal information and demographic profile. Based on this information, subscriber software system 40 completes a subscription form which is eventually transmitted to a database located in server system 20. Thereafter, subscriber software system configures computer 26 based on the information received from the subscriber and commences a test connection with server system 20 to determine whether the system configuration is valid. The installation process is described in more detail with reference to FIG. 6.

Figure 3:
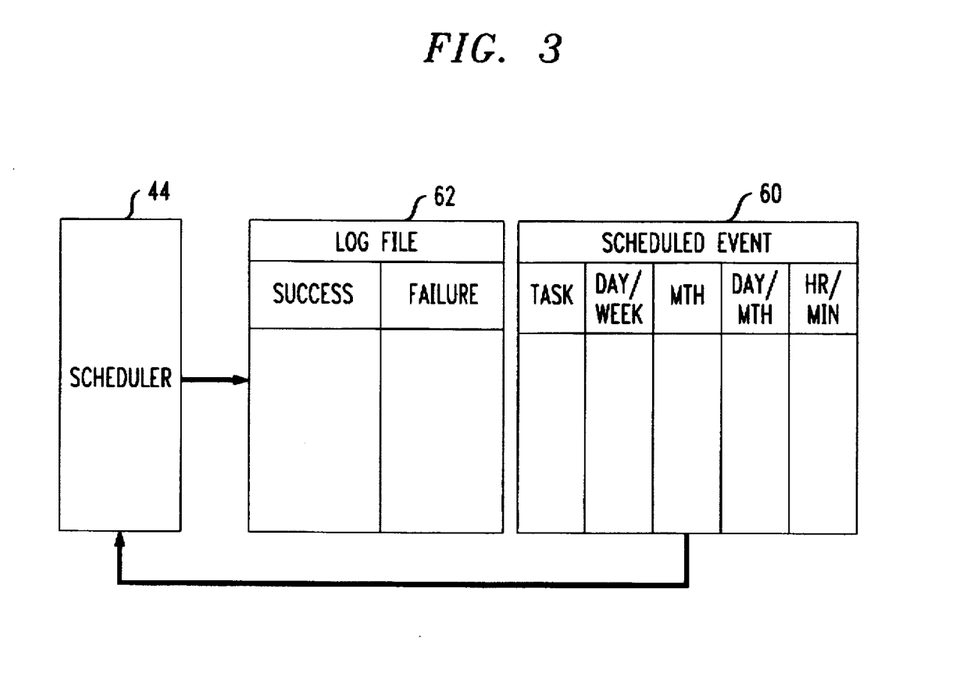
FIG. 3 illustrates a scheduler system in accordance with one embodiment of the present invention.

FIG. 3 is a block diagram illustrating some of the files that are controlled by scheduler 44. In accordance with one embodiment of the invention, scheduler 44 causes information to be read from and written to a schedule of events file 60. The schedule of events file contains a list of events that are intended to be performed by subscriber software system 40. For example the categories of information that are stored in one embodiment of schedule of events file in accordance with the present invention are the type of tasks to be performed, days of the week that the tasks must be performed, months within which the tasks must be performed, days of the month that the tasks must be performed and hours and minutes that the tasks must be performed. However, the invention is not limited in scope to the scheduled times identified herein. Furthermore, the type of tasks identified herein may vary according to a particular application. For example, in a publishing context, such tasks may preferably comprise communicating with a server system and downloading appropriate files as explained hereinafter.

Scheduler 44 also controls a log file 62 as illustrated in FIG. 3. Log file 62 includes information such as whether a task to be performed by subscriber software system 40 was performed successfully. Subscriber software system 40 employs the log file to keep track of all the tasks that need to be performed and whether they were performed successfully or not.

The information contained in schedule of events file 60 is advantageously updated by the corresponding publisher. In accordance with an alternative embodiment of the invention, this information is also subject to alteration by the subscriber. Thus, for example, the publisher controls the times the subscriber's computer 26 is prompted to communicate with server system 20 and to download the set of files intended for the subscriber's use.

In certain circumstances, it is important that all subscribers receive time-sensitive data at substantially the same time. For example, news publications that broadcast financial data desire to disseminate their news information on a timely basis to all their subscribers regardless of each subscriber's local time zone. In order to synchronize the times stored in scheduler of event files, server system 20 transmits an appropriate offset correction time to all subscriber software systems 40 upon their initial contact. For example, when a subscriber software system 40 first contacts the server system, it transmits its local time to the server system. In response, server system calculates the offset time necessary to synchronize the subscriber's local time with a publisher's reference time, such that all scheduled events take place at the publisher's reference time. Server system 20 transmits the offset correction time to scheduler 44. In response the appropriate scheduled events stored in the schedule of events file are adjusted based on the offset correction time.

As a result of this time synchronization feature employed by the scheduler system in accordance with the present invention, it is possible for all subscribers across various time zones to contact server system 20 at substantially the same time to download time-sensitive information at about the same time.

Figure 4:
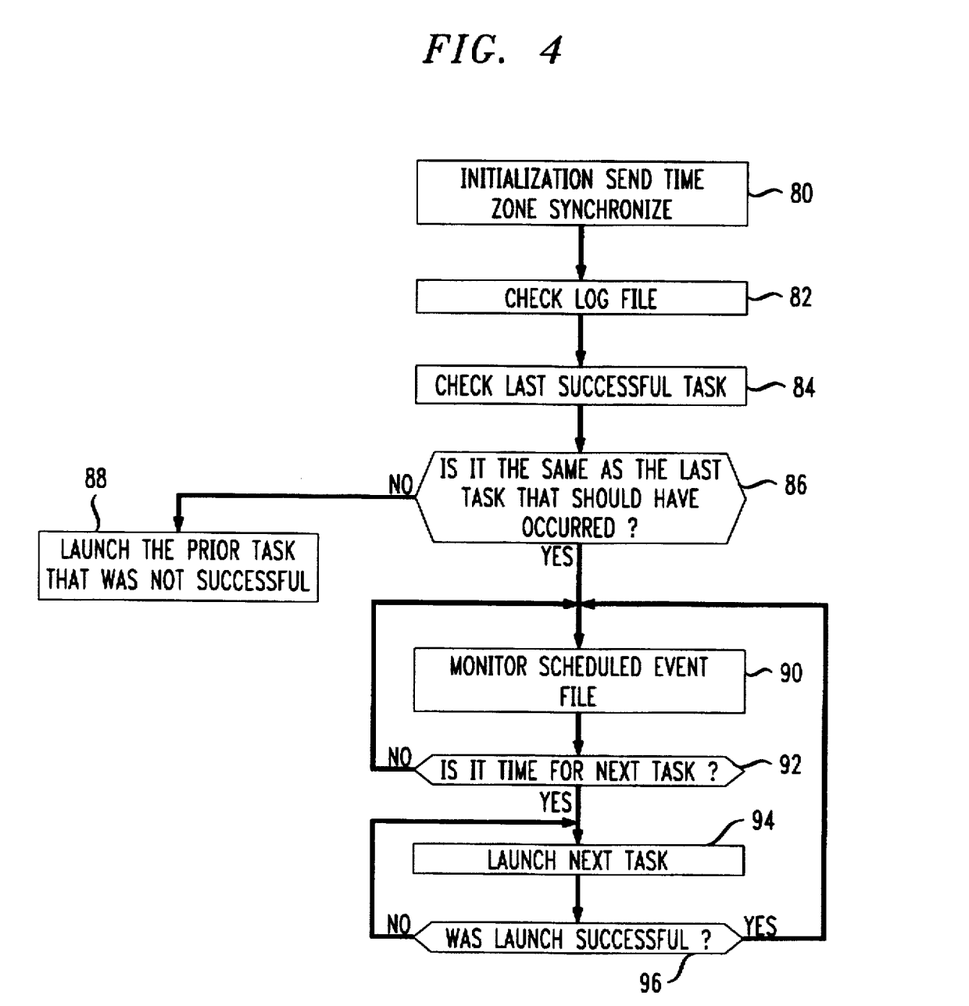
FIG. 4 is a flow chart illustrating the operation of a scheduler system in accordance with an embodiment of the present invention.

FIG. 4 illustrates the operation of a scheduler 44 in accordance with one embodiment of the present invention, although the invention is not limited in scope in that respect. At step 80 scheduler 44 begins a system initialization. This includes the step of sending the computer's local time to server system 20 and receiving an offset correction time from server system 20. At step 82 scheduler 44 checks log file 62. Thereafter at step 84 scheduler 44 determines the time which the last successful task took place. At step 86, scheduler 44 determines whether this last successful task is the same as the last task that was scheduled to take place. If so, scheduler 44 continues its operation at step 90. Otherwise, scheduler 44 goes to step 88 to launch a prior task that did not take place successfully. This occurs for example, when the computer was turned off during a scheduled event. In that case, during a scheduled event, no connection to server system 20 could have taken place. The next time that the computer is on, subscriber software system 40 allows scheduler 44 to check the schedule log to determine whether the last scheduled event took place or not. If not, subscriber software system 40 is configured to take certain actions. For example, in accordance with one embodiment of the invention, scheduler 44 launches the last task that should have been successfully taken place, if the computer were "on" at the scheduled time. In another embodiment of the invention, the system looks back at a series of scheduled events that should have taken place and executes some or all of the ones that were never launched.

At step 90, scheduler 44 monitors schedule of events file. At step 92, scheduler 44 determines whether the time has come for the next scheduled event. If not, the system goes back to step 92 to monitor the schedule of events file. If however, the time has come for the next scheduled event, scheduler 44 goes to step 94 to launch the next scheduled event. Scheduler 44 at step 96 determines whether the last scheduled event was successful or not. If not, scheduler 44 repeats step 94 and 96 until a scheduled event has been successfully launched.

One of the events that is launched by scheduler 44 is a communication connection to server system 20 in order to download data files that are provided by each publisher and intended for subscribers that are subscribed to services of each of the publishers. In order to assure the integrity of the files transferred from server system 20 to each subscriber's computer 26, a communications scheme in accordance with one embodiment of the present invention is employed as described hereinafter.

Figure 5:
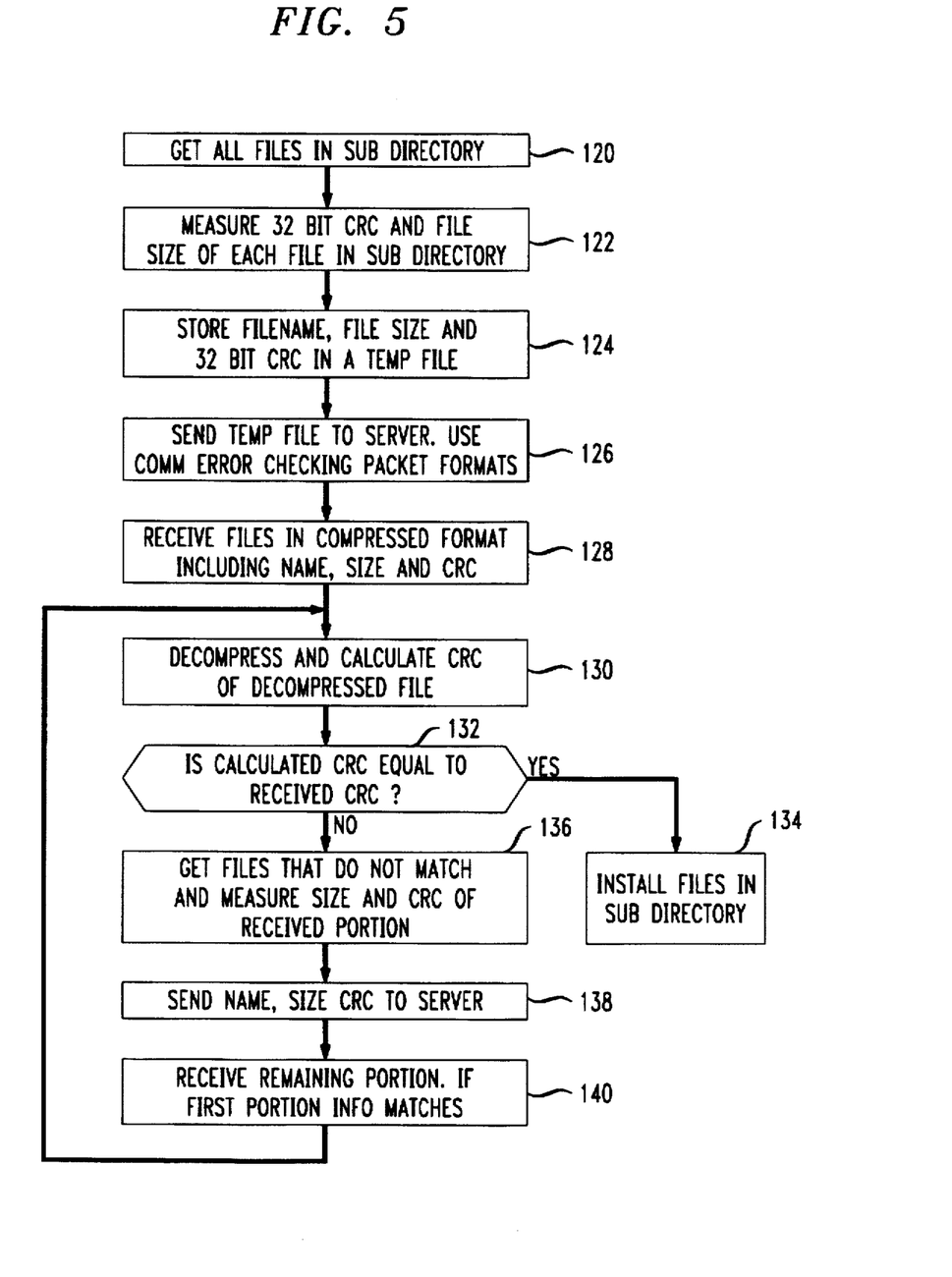
FIG. 5 is a flow chart illustrating the operation of a communications session in accordance with one embodiment of the present invention.

FIG. 5 illustrates the operation of accessing a server system 20 and downloading data files intended for a subscriber software system. At step 120 subscriber software system 40 prompts communication manager 46 to access all files currently stored in subscriber's directory relating to a particular publisher. At step 122, communications manager 46 calculates a 32 bit cyclic redundancy code (CRC) and filesize of each file stored in the subscriber's directory relating to a particular publisher. The operation for measuring CRC of each file is well-known. Generally, the CRC code for each file is a number that uniquely identifies a file based on its contents. The probability that two files have the same CRC is extremely low and is substantially zero for purposes of the present invention. By employing the CRC codes in addition to filesizes, server system 20 can advantageously track different versions of the same filename. Thus, each publisher can easily update its files without the need to change the filenames. Each version of a file is then identified, among other things, by its unique CRC code identifier.

At step 124, communications manager 46 stores in a temporary file, the filenames, corresponding filesizes and corresponding CRC codes. At step 126, communications manager 46 sends the contents of the temporary file to server system 20. Depending on the communications scheme employed in establishing a communications contact between server system 20 and a computer 26, a standard error correction protocol is utilized to assure the integrity of information transmitted and/or received. For example, a communications scheme in accordance with X.25 protocol includes an error correction mechanism that is standard for all transmissions sent in accordance with the protocol.

Server system 20 checks the files that are currently stored in subscriber software system 40 for a particular publisher. It then determines the files that are intended for the subscriber, based on instructions received from the publisher. Server system 20 measures the CRC code and the size for each file that is intended for the subscriber and then compresses these files. Server system 20 then transmits the compressed files to subscriber software 40 along with the filename of each file and its corresponding CRC code and file size. Server system 20 compresses the files in accordance with any commercially available compression schemes, such as the compression protocol known as "ZIP." At step 128, communications manager 46 receives the updated files in compressed format. Thereafter at step 130, communications manager 46 decompresses each file and calculates the CRC code for each decompressed file.

At step 132, communications manager 46, for each received file compares the CRC code received from system server 20, with the CRC code calculated after decompressing the files. If for all the files, the CRC codes received and calculated are equal, then all the files have been received intact. Thus, communications manager 46 goes to step 134 and installs the received files in subscriber's subdirectory, ready for viewing by the subscriber.

On the other hand, if the CRC code of a file received from server system 20 is not equal to the CRC code calculated by communications manager 46 after decompression of the file, the system goes to step 136 to operate on files whose calculated CRC after decompression is not equal to the CRC code sent by system server 20. These files are considered incomplete by communications manager. To this end subscriber software system 40 attempts to correct the problem in accordance with one embodiment of the present invention as described hereinafter.

One of the main reasons that the calculated CRC code does not match the CRC code received from server system 20 is due to break downs in the communications session. For example, many times during the transfer of data files, the communications path is interrupted, when one of the computers that form the communications network cease to operate. Sometimes, mainly because the software system operates in the background, a subscriber may turn computer 26 off while a data transfer with server system 20 was in session.

Communications manager 46 in conjunction with server system 20 attempt to recover the error by completing the transfer of the file without retransmitting the entire file from the beginning. To this end, communications manager 46 measures the size of the incomplete files after the decompression process described above. It also measures the CRC code of the received incomplete file.

At step 138, communications manager 46 sends to server system 20, the names of the incomplete files, along with the filesize and their corresponding CRC codes. In response, server system 20 analyses the copy of the file that it has stored in its database corresponding to the information received from communications manager 46. Server system 20 retrieves the portion of data from the corresponding file, equal to the filesize it has received from communications manager 46. It then measures the CRC code for the retrieved portion of the file and compares the measured CRC code for this retrieved portion with the CRC code received from communications manager 46. If the CRC codes for the same portion of the file stored in server system 20 and the file received by communications manager 46 are equal, then the communications manager considers the portion of the file received by communications manager to be intact. To this end, server system 20 transmits the remaining portion of the file to subscriber system 40, rather than transmitting the entire file again. Server system 20 measures the size and the CRC code for the remaining portion of the file to be sent to subscriber system 40 and compresses this remaining portion. Thereafter, server system 20 transmits the compressed file portion along with the filename, filesize and the CRC code for that remaining portion.

At step 140, communications manager 46 receives the remaining portion, and then goes to step 130 to decompress the received portion, and calculate the CRC code of the decompressed portion. If the calculated CRC code for the remaining portion is equal to the CRC code transmitted by server system 20, communications manager 46 considers the transfer of the remaining portion to be successful. Thereafter, communications manager 46 combines the received first portion with the remaining received portion as a complete received file. Once all incomplete files have been completed in accordance with the process described above, communications manager 46 installs all the completed files in the corresponding subdirectory in subscriber software system 40.

It will be appreciated that the error recovery in accordance with the principles described above significantly reduces the time it takes to complete the reception of a file from a remote computer. Specifically, whenever there is an interruption during the transfer of a substantially large file, the need to retransmit the entire file again is eliminated. Although the embodiment described above relates to news data files transmitted by publishers, the invention is not limited in this context, and the error recovery in accordance with the principles of the present invention is equally applicable to other data communications scenarios.

For example, many software providers desire to sell their software directly through a computer network, such as Internet. One drawback associated with such transactions is that the size of software files to be transferred are substantially large. A customer is required to wait through the entire session of software file transfer. In the event of any communications interruption, the subscriber has to prompt the vendor again to repeat the entire process again and retransmit the entire file. The time associated with such a data transfer discourages many potential customers to purchase software files via computer networks. However, in accordance with principles of the present invention, the data file transfer is accomplished transparently, at a much reduced time period. The subscriber software system in conjunction with server system 20 automatically repeats the file transfer procedure described above, until it is certain that all files have been received intact.

Figure 6:
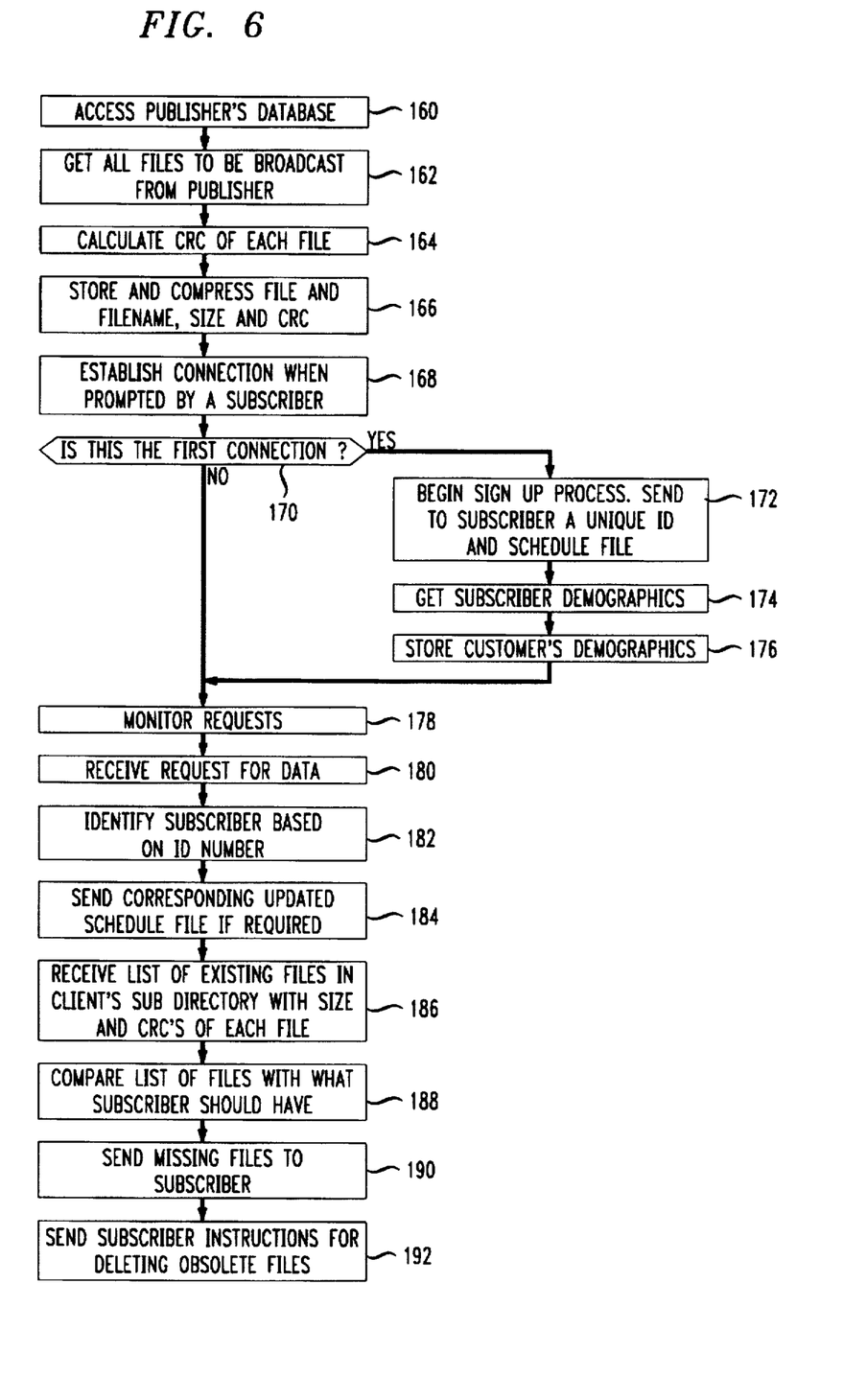
FIG. 6 is a flow chart illustrating the operation of a server system in accordance with one embodiment of the invention.

The operation of sever system 20 is described in more detail with reference to FIG. 6. At step 160, server system 20 establishes a communications contact with publisher's database system. At step 162, server system 20 receives all files from a corresponding publisher, which are intended to be transmitted to all corresponding subscribers. In addition, all new schedule of events files are also transmitted by each publisher to server system 20, so that these schedule of events files are in turn transmitted to each subscriber's software system 40. Thus, each publisher is allowed to control the times which a subscriber is scheduled to access server system 20.

At step 164 server system 20 calculates the file size and CRC code corresponding to each file received from publisher 24. In accordance with another embodiment of the invention, the CRC code identifiers and filsizes for each file may be calculated by the publisher's system and sent along with the files to server system 20. However, the invention is not limited in scope in that respect.

At step 166, server system 20 compresses each file intended to be transmitted to corresponding subscribers. Server system 20 stores each compressed file along with the CRC code identifier of the file in its decompressed version and the filenames and the filesizes.

At step 168, server system 20 establishes a connection with a subscriber software system, when prompted to do so by a subscriber. At step 170, server system 20 determines whether this is the first connection with the subscriber. If so, server system begins a sign up process to include the subscriber as a regular member for receiving data files at step 172. To this end, server system 20 sends a unique subscriber identifier to subscriber's software system. It also sends a schedule of events file so that the subscriber's software system would be able to communicate with the server system at predetermined schedules.

At step 174, server system 20 queries the subscriber with demographic information. At step 176, server system 20 stores subscriber's demographics in database 16 (FIG. 1). The demographic information may advantageously include the subscriber's personal information, job information and company information. This information is preferably available to a corresponding publisher for further market analysis. Server system 20 also queries the subscriber whether the computer that is being used by the subscriber is part of a local network that employs a proxy server. If so, server system 20 requests the proxy address from the subscriber. The operation of proxy servers are well-known, and is not described herein in detail.

Server system 20 also conducts a test communication session with the subscriber's computer to verify whether the configuration employed by subscriber software system operates as intended. To this end, server system 20 during this test session checks the communication setup and communication lines employed to contact the server system.

Server system 20 then goes to step 178 to monitor requests received from various is subscribers. As mentioned before, each subscriber may have more than one subscription to various publishers. Furthermore, server system 20 preferably provides information corresponding to a plurality of different publishers. For example, server system 20 in accordance with one embodiment of the invention stores all the necessary files corresponding to each publisher for further transmission to each subscriber that is subscribed to that publisher. Thus, server system 20 monitors all requests related to any of the publishers that are being served by the server system. At step 180, server system 20 receives a request for updated data files corresponding to a given publisher. Server system 20, first identifies the subscriber who has transmitted the request, based on the unique identifier assigned to the subscriber. At step 184, server system 20 transmits corresponding updated schedule of events file if necessary. At step 186, server system 20 receives a temporary file containing a list of existing files in subscriber's subdirectory along with filesizes, file names, and CRC codes, as explained in reference with step 126 of FIG. 5.

Server system 20 then goes to step 188 and compares the information received at step 186, with what the subscriber system should have in the subdirectory. At step 190, server system 20 sends missing files to the subscriber as explained in reference with step 128 of FIG. 5. At step 192, server system 20 sends an instruction code to the subscriber so as to delete the obsolete files in subscriber's subdirectory.

As mentioned before, the process of updating the subscriber's files appears transparent to the subscriber. The subscriber is only notified when all the files have been successfully transferred to the subscriber's computer.

Figure 7:
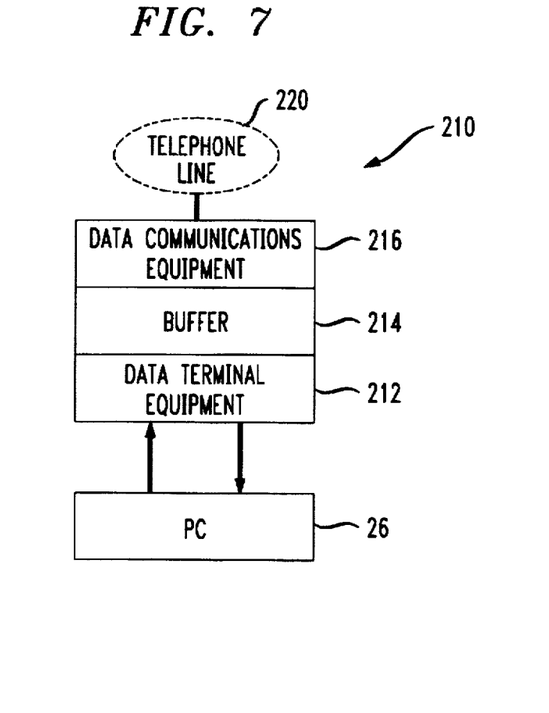
FIG. 7 is a block diagram of data transfer in a modem controlled by a communications system employed in accordance with one embodiment of the present invention.

In accordance with one embodiment of the invention, communications manager 46 of subscriber software system 40 (FIG. 2) controls the flow of information passing through modem 210 as illustrated in FIG. 7. Modem 210 comprises a data terminal equipment (DTE) 212, a data buffer 214 and a data communications equipment (DCE) 216. The operation of modem 210 is well-known and is not described in detail. Briefly, data terminal equipment 212 is responsible for sending data to and receiving data from computer 26. This data is in digital form and is transferred back and forth at a typical rate of 115 Kbytes/sec. In contrast, data communications equipment 216 transfers data back and forth to a telephone line. This data is in analog form and is transferred at a typical rate of 28.8 Kbytes/sec. Since the data transfer rate at the DCE side of modem 216 is substantially slower than data transfer rate at its DTE side, data buffer 214 is employed so as to prevent data loss.

Typically each modem employs a flow control mechanism wherein the flow of data transferred from computer 26 to data terminal equipment 212 is managed such that data buffer 214 is not overfilled. Thus, modem 210 sends a signal to computer 26 to stop sending data until data buffer 214 has additional space to accommodate more data. This flow control mechanism is typically employed by either software or hardware. However, in order for the flow control mechanism to function properly it is necessary to configure the modem parameters properly in accordance with modem manufacturer's specifications. Many times, subscribers who use computer 26 to communicate with server 20 do not configure the modem in accordance with such specifications leading to communications error due to failure of modem flow control.

Figure 8:
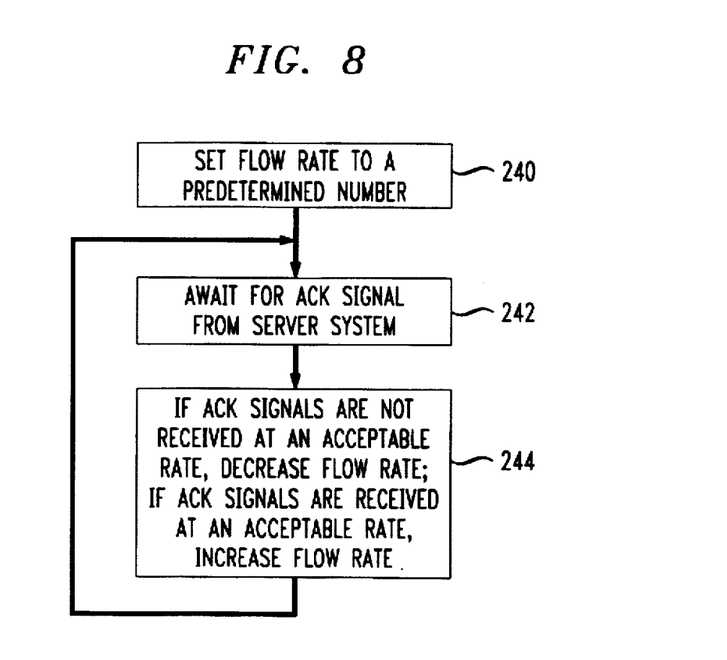
FIG. 8 is a flow chart illustrating the operation of modem data flow control in accordance with one embodiment of the present invention.

In accordance with one embodiment of the present invention, communications manager 46 (FIG. 2) in conjunction with server system 20 employs a data flow control that prevents modem failures described above, regardless of whether the subscriber has properly configured the modem. FIG. 8 is a flow chart illustrating a modem data flow control in accordance with the present invention. At step 240 communications manager 46 sets a predetermined data size, for example, 5000 bytes. Thereafter, batches of data having the size of 5000 bytes are sent by computer 26 to modem 210 and finally to server system 20. Communications manager 46 thereafter stops the data flow, after sending each batch of data, until an acknowledgment from server system 20 is received at step 242. At step 244, communications manager determines whether such acknowledgment signals are received at an acceptable rate from server system 20. If not, communications manager 46 decreases the data size from its initial value set at step 240. On the other hand, if it appears that the acknowledgment signals are received at an acceptable rate, communications manager increases the size of data batches that are sent from computer 26 to server system 20. Communications manager 46 then goes to step 242 again, and awaits an acknowledgment from server system 20, before it authorizes computer 26 send the next batch of data. The system goes to step 244, and repeats the above process again. One advantage of the data flow control in accordance with the present invention is that the subscriber is not required to configure the modem in accordance with the manufacturer's specifications in order to have prevent flow control errors.

Figure 9:
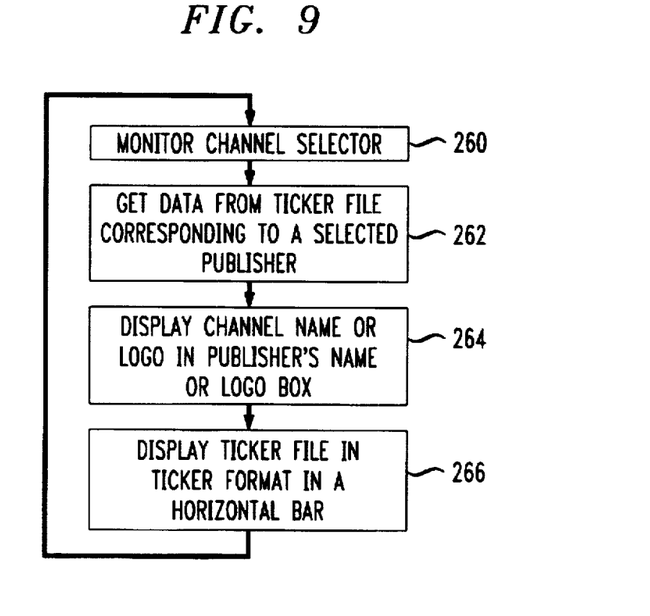
FIG. 9 is a flow chart illustrating the operation of a user interface in accordance with one embodiment of the present invention.
Figure 10:
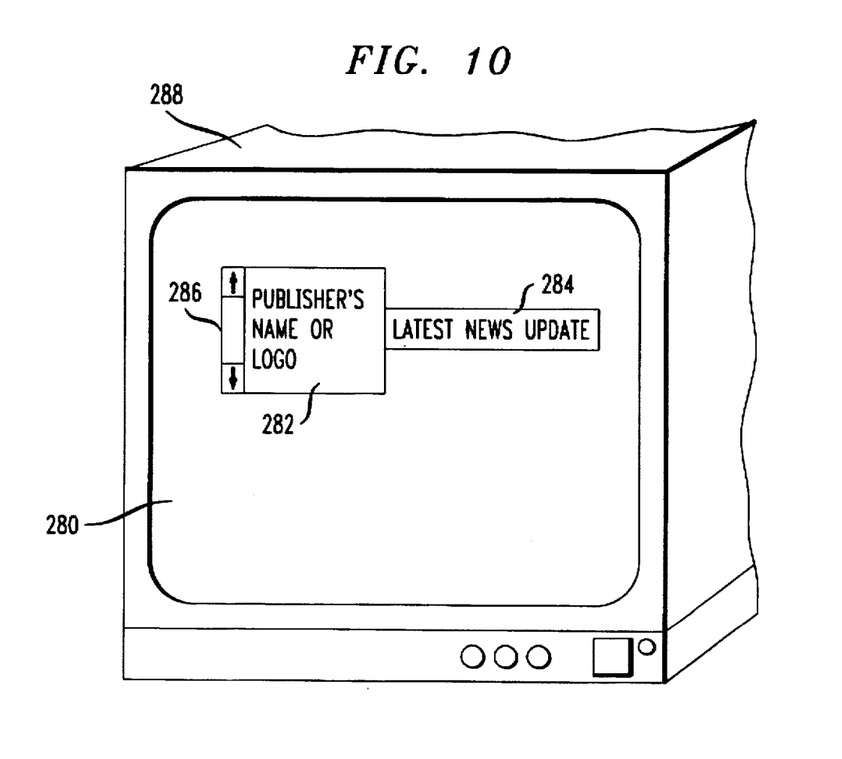
FIG. 10 is an illustration of a user interface displayed in accordance with one embodiment of the present invention.

The operation of viewer manager 48 is described in more detail hereinafter with reference to FIGS. 9 and 10. Viewer manager 48 (FIG. 2) displays a ticker 284 on screen 280 of a display monitor 288. Display monitor 288 is controlled by computer 26 (FIG. 1). Ticker 284 is configured so that a predetermined message scrolls continuously along its length. For example, the latest news headline may be scrolled on ticker 284. For a subscriber who is subscribed to more than one publisher, viewer manager 48 displays an up and down channel selector 286 on screen 280. In accordance with one embodiment of the invention, channel selector 286 appears as a vertical scroll bar with up and down arrows. Viewer manager 48 also displays a publisher's name or logo 282 on screen 280. In accordance with one embodiment of the present invention, publisher's name or logo 282 appears in a box, such that ticker 284 is connected to its right side and channel selector 286 is connected to its left side. However, the invention is not limited in scope to such an arrangement and other arrangements can be designed in accordance to the principles discussed herein. The operation of viewer manager is described in more detail hereinafter.

At step 260 viewer manager 48 monitors channel selector 286 to determine which publisher's information must be displayed at ticker 284. At step 262, viewer manager 262 retrieves the data from a ticker file corresponding to a selected publisher. To this end, each publisher provides a data file that it desires to be displayed on subscriber's monitors on ticker 284. At step 264, viewer manager 48 displays the publisher's name or logo 282. At step 266, viewer manager 48 displays the contents of the ticker file corresponding to a selected publisher on ticker 284 by scrolling the data in a ticker format. Viewer manager 48 goes back to step 260 and awaits for a new channel selection corresponding to another publisher.

Thus, during operation, each subscriber views on the monitor a ticker bar 284 that displays scrolling messages corresponding to a publisher. Simultaneously, the subscriber also views the publisher's name or its logo. A channel selector allows the subscriber to flip through various messages provided by different publishers whose data files are accessible to the subscriber. In accordance with one embodiment of the invention, viewer manager 48 allows the subscriber to move a cursor or a pointer along the screen 280, for example by a desktop mouse. The subscriber may then click on the up or down arrow of channel selector 286 to change the publisher. Furthermore, by double clicking on publisher's name or logo 282, viewer manager 48 retrieves all the files relating to the selected publisher for viewing by the subscriber. These files may form the electronic version of a publication as discussed above. In accordance with another embodiment of the invention, the position and size of ticker 284, publisher's name or logo 282 and channel selector 286 may be varied by the subscriber by clicking and dragging the mouse according to well-known protocols. The viewing arrangement describer herein allows for a remarkably convenient way to interact with subscriber software 40. Furthermore, subscribers are notified in an efficient manner of updated messages.

Thus, the present invention provides for a convenient way to receive on-line information relating to a plurality of publishers or software vendors without the disadvantages associated with downloading data through the Internet.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. A method for operating a server system adapted to provide on-line publications via a computer communications network to a plurality of subscribers, comprising the steps of:

storing in a database server publication data files received from a plurality of publishers;

maintaining a schedule of events file adapted to contain information relating to predetermined downloading schedules to said subscribers via said communications network desiring a corresponding publication;

transmitting to said plurality of subscribers schedule information corresponding to said schedule of events file so as to provide the times which said subscribers are scheduled to access said server system;

receiving from each subscriber at said scheduled times an information request in accordance with said schedule of events file and a list of existing files in said subscriber's database including said file names, file sizes and corresponding file identification code;

transmitting to said subscriber a set of predetermined data files as authorized by a corresponding one of said publishers, including each file's name, size and identification code in response to said information request from each one of said subscribers.

2. The method in accordance with claim 1 further comprising the step of calculating a CRC code for each file received from each publisher.

3. The method in accordance with claim 2 further comprising the step of compressing files received from each publisher.

4. The method in accordance with claim 2 further comprising the step of signing up a subscriber when said subscriber transmits said information request for the first time.

5. The method in accordance with claim 4 wherein said step of signing up further comprises the step of sending the subscriber a unique subscriber identification number.

6. The method in accordance with claim 4 wherein said step of signing up further comprises the step of prompting said subscriber for demographic information.

7. The method in accordance with claim 4 further comprising the step of sending instructions to each subscriber for deleting predetermined files contained in said subscriber's directory.

8. The method in accordance with claim 2 further comprising the step of receiving from each subscriber the name of files that were not properly received by said subscriber along with the size of the portion of the file received by said subscriber and the CRC code of said portion received by said subscriber.

9. The method in accordance with claim 8 further comprising the step of calculating the CRC code of said portion of the file received by said subscriber.

10. The method in accordance with claim 9 further comprising the step of comparing said CRC code transmitted by said subscriber with said calculated CRC code of said portion of the file received by said subscriber; and transmitting the remaining portion of said file to said subscriber when said CRC codes are equal.

11. The method in accordance with claim 1 further comprising the steps of receiving from said subscribers their corresponding local time zones and responsive thereto, transmitting a corresponding offset time necessary to synchronize the subscriber's local time with a publisher's reference time, such that all scheduled events take place at the corresponding publisher's reference time.

12. The method in accordance with claim 1 further comprising the steps of:
receiving a data batch having a predetermined variable size from a modem coupled to each subscriber's computer terminal; and
transmitting an acknowledgment signal to said subscriber, such that said subscriber's computer terminal controls the flow of information through said modem by varying the size of said data batch based on the number of acknowledgment signals transmitted by said server.

13. The method in accordance with claim 12, wherein the size of said data batch is decreased when the rate of said acknowledgment signals are below a given value.

14. A method for downloading data files from a server system to a subscriber's computer system, said data files originated by a plurality of publishers, said method comprising the steps of:
maintaining a schedule of events file containing a time schedule for downloading said data files;
maintaining a log file for tracking the success and failure of said events;
transmitting an information request to said server system when said event is launched at a scheduled time;
receiving a group of files corresponding to a publisher from said server system, and their corresponding file sizes and CRC codes in response to said information request;
tracking said log file to determine whether the last event scheduled was completed successfully; and
launching said last event when said log file indicates that said last event scheduled was not completed successfully.

15. The method in accordance with claim 14, wherein said step of launching an event further comprises the steps of transmitting to said server system an information request in accordance with said schedule of events file and a list of existing files in said subscriber's database including said file names, file sizes and corresponding file identification code; and
receiving from said server system a set of predetermined data files as authorized by a corresponding one of said publishers, including each file's name, size and identification code in response to said information request from each one of said subscribers.

16. The method in accordance with claim 15, wherein said data files are in compressed format.

17. The method in accordance with claim 16 further comprising the step of decompressing each file received from said server system.

18. The method in accordance with claim 17 further comprising the step of calculating a CRC code for each file received from said server system.

19. The method in accordance with claim 15 further comprising the step of receiving from said server system instructions for deleting predetermined files contained in said subscriber's directory.

20. The method in accordance with claim 19 further comprising the step of transmitting to said server system the name of files that were not properly received by said subscriber along with the size of the portion of the file received by said subscriber and the CRC code of said portion received by said subscriber.

21. The method in accordance with claim 20 further comprising the step of calculating in said server system, the CRC code of the portion of the file that was received by said server system.

22. The method in accordance with claim 21 further comprising the step of receiving the remaining portion of said file to said subscriber when said CRC codes are equal.

23. The method in accordance with claim 14 further comprising the steps of transmitting to said server system a corresponding local time zone and responsive thereto, receiving a corresponding offset time necessary to synchronize the subscriber's local time with a publisher's reference time, such that all scheduled events take place at the corresponding publisher's reference time.

24. The method in accordance with claim 14 further comprising the steps of:
transmitting to said server system a data batch having a predetermined variable size from a modem coupled to each subscriber's computer terminal;
receiving an acknowledgment signal from said server system, such that said subscriber's computer terminal controls the flow of information through said modem by varying the size of said data batch based on the number of acknowledgment signals transmitted by said server system.

25. The method in accordance with claim 24, wherein the size of said data batch is decreased when the rate of said acknowledgment signals are below a given value.

26. The method in accordance with claim 14 further comprising the steps of:
displaying a channel selection menu on said subscriber's monitor, each channel corresponding to a publisher to which said subscriber is subscribed;
displaying a scrolling ticker display configured to display the contents of a file corresponding to a selected channel on said monitor; and
displaying a channel identification symbol corresponding to said selected channel.

27. The method in accordance with claim 26 further comprising the steps of displaying said scrolling ticker display as a horizontal bar.

28. The method in accordance with claim 27, further comprising the steps of displaying said channel selection menu as a vertical bar comprising an up and a down arrow.

29. The method in accordance with claim 28, wherein said channel identification symbol comprise a publisher's name.

30. The method in accordance with claim 28, wherein said channel identification symbol comprise a publisher's logo.

31. The method in accordance with claim 28 further comprising the step of displaying said identification symbol in a region defined by a box, wherein said horizontal ticker display and said channel selection bar are disposed at each side of said box.

32. A method for receiving by a subscriber, data files from a server system, said data files generated by a plurality of publishers, said method comprising the steps of:

said subscriber communicating with said server system via a computer so as to request datafiles corresponding to each publisher;

receiving said datafiles from said server system in response to said request;

displaying a channel selection menu on said subscriber's monitor, each channel corresponding to a publisher to which said subscriber is subscribed;

displaying a scrolling ticker display configured to display the contents of a ticker file corresponding to a selected channel on said monitor; and displaying a channel identification symbol corresponding to said selected channel.

33. The method in accordance with claim 32 further comprising the steps of displaying said scrolling ticker display as a horizontal bar.

34. The method in accordance with claim 33, further comprising the steps of displaying said channel selection menu as a vertical bar comprising an up and a down arrow.

35. The method in accordance with claim 34, wherein said channel identification symbol comprise a publisher's name.

36. The method in accordance with claim 34, wherein said channel identification symbol comprise a publisher's logo.

37. The method in accordance with claim 34 further comprising the step of displaying said identification symbol in a region defined by a box, wherein said horizontal ticker display and said channel selection bar are disposed at each side of said box.

38. A method for transmitting by a server system to a subscriber via a computer communications network data files generated by at least one publisher, said method comprising the steps of:

(a) said server system communicating with said subscriber via a computer so as to transmit at least one data file corresponding to said publisher in response to a subscriber request;

(b) said server system transmitting a copy of said requested data file;

(c) said server system receiving from said subscriber the name of the data file that was not properly received by said subscriber along with the size of the portion of the data file received successfully by said subscriber and the CRC code of said portion received successfully by said subscriber; and (d) said server system transmitting the remaining portion of said data file to said subscriber when said CRC code received by said server system is equal to a CRC code calculated by said server system, said CRC code calculated by said server system corresponding to the portion of data file that was successfully received by said subscriber.

39. The method in accordance with claim 38 further comprising the steps of transmitting a plurality of data files to said subscriber.

40. The method in accordance with claim 39 further comprising the steps of repeating said steps (c) and (d) until all files transmitted by said server system are successfully received by said subscriber.

* * * * *